(12) United States Patent
Okitsu

(10) Patent No.: US 8,184,233 B2
(45) Date of Patent: May 22, 2012

(54) BACKLIGHT CHASSIS FOR LIQUID CRYSTAL DISPLAY PANEL

(75) Inventor: Motoaki Okitsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 266 days.

(21) Appl. No.: 12/668,066

(22) PCT Filed: Mar. 27, 2008

(86) PCT No.: PCT/JP2008/055867
§ 371 (c)(1),
(2), (4) Date: Jan. 7, 2010

(87) PCT Pub. No.: WO2009/008195
PCT Pub. Date: Jan. 15, 2009

(65) Prior Publication Data
US 2010/0195015 A1 Aug. 5, 2010

(30) Foreign Application Priority Data
Jul. 10, 2007 (JP) ................................. 2007-180650

(51) Int. Cl.
*G02F 1/1333* (2006.01)

(52) U.S. Cl. ................................. 349/58; 349/59; 349/60

(58) Field of Classification Search ............... 349/58–60
See application file for complete search history.

(56) References Cited

U.S. PATENT DOCUMENTS

| 2005/0117086 A1 | 6/2005 | Sugahara et al. |
| 2006/0109616 A1 | 5/2006 | Lee et al. |

FOREIGN PATENT DOCUMENTS

| CN | 1662124 A | 8/2005 |
| JP | 04-138609 A | 5/1992 |
| JP | 04-284302 A | 10/1992 |
| JP | 10-125119 A | 5/1998 |
| JP | 2005-107499 A | 4/2005 |
| JP | 2006-337776 A | 12/2006 |

OTHER PUBLICATIONS

Official Communication issued in International Patent Application No. PCT/JP2008/055867, mailed on Jul. 1, 2008.

*Primary Examiner* — Phu Vu
(74) *Attorney, Agent, or Firm* — Keating & Bennett, LLP

(57) ABSTRACT

A backlight chassis is constituted by combining a right end chassis plate, a left end chassis plate, and an intermediate chassis plate obtained by cutting a metal sheet into a predetermined shape and pressing. A trough portion is formed in each chassis plate at a portion to be the long side of the backlight chassis, and the trough portions are superimposed at the boundary of adjoining chassis plates. Furthermore, a superimposed portion constituting a beam-shaped portion is provided at the boundary of adjoining chassis plates. The chassis plates are coupled by screws penetrating the superimposed portion of the trough portions or the beam-shaped portions. The right end chassis plate and the left end chassis plate have point symmetric shapes.

4 Claims, 10 Drawing Sheets

BACKLIGHT CHASSIS FOR LIQUID CRYSTAL DISPLAY PANEL

BACKGROUND OF THE INVENTION

1. Field of the Invention

The present invention relates to a backlight chassis for a liquid crystal display panel.

2. Description of the Related Art

A backlight chassis holding a light source lamp as a backlight for a liquid crystal display panel is, in a case in which the liquid crystal display panel is a large one, typically formed of a metal sheet (specifically, a steel sheet) in view of strength and cost. An example of such a backlight chassis made of a metal sheet is disclosed in JP-A-2005-107499.

Although the backlight chassis disclosed in JP-A-2005-107499 has a ladder configuration, backlight chassis are also often formed to have a tray configuration. A backlight chassis having a tray configuration has an increased size and suffer the following disadvantages.

That is, so called "oil canning", in which the center of a metal sheet is popped back or forth so as to be warped, occurs. In some cases, the center of a metal sheet is even warped to be as much as several millimeters deviated from the planned geometric plane. The thus-structured backlight chassis generates abnormal noise (chattering noise) when it receives vibration. In addition, a light source lamp (e.g., a cold-cathode tube) incorporated in such a backlight chassis is of a long length, and thus, when vibration (for example, acoustic vibration of a television speaker) is transferred thereto, the light source lamp makes noise. To avoid such noise, the center portion of the light source lamp is fixed to the backlight chassis with a clip. However, if a large impact is received due to the occurrence of oil canning, the engagement between the light source lamp and the clip may be released. If the engagement is not released, the light source lamp itself will be warped, and as a result, a crack may occur in the lamp, or the distance between the lamp and the liquid crystal display panel may become non-uniform to cause non-uniform brightness. To cope with these problems, a large number of backlight chassis are provided with a reinforcement metal fitting on the rear surface thereof to reduce oil canning.

SUMMARY OF THE INVENTION

In view of the above problems, preferred embodiments of the present invention provide a backlight chassis for a liquid crystal display panel that stays resistant to oil canning in a metal sheet even when it is produced to have a large area.

According to a preferred embodiment of the present invention, a backlight chassis for a liquid crystal display panel is provided with a plurality of chassis plates each formed of a metal sheet that is cut and stamped into a predetermined shape. Here, each of the chassis plates corresponds to one of sections into which a whole chassis is divided, and adjoining chassis plates are connected to each other to form a whole chassis.

With this structure, oil canning in the metal sheet is dispersed to each of the chassis plates as minor oil canning. As a result, even with a structure in which a lamp is held at its middle portion by a clip fitted to a backlight chassis, the engagement between the clip and the lamp is prevented from being released, abnormal noise is reduced, and brightness is less likely to become non-uniform.

According to a preferred embodiment of the present invention, in the above-structured backlight chassis for a liquid crystal display panel, it is preferable that each of the chassis plates have a trough-shaped portion or a beam-shaped portion in a border portion with an adjoining chassis plate, and that the trough-shaped portions or the beam-shaped portions of adjoining chassis plates be superposed one on top of the other to connect the adjoining chassis plates to each other.

With this structure, the trough-shaped portion or the beam-shaped portion functions as a reinforcing metal fitting to increase the rigidity of the backlight chassis, and this helps reduce oil canning.

According to a preferred embodiment of the present invention, in the above-structured backlight chassis for a liquid crystal display panel, it is preferable that adjoining chassis plates be connected to each other with a screw that is screwed into a superposition portion of the trough-shaped portions or a superposition portion of the beam-shaped portions.

With this structure, large-area backlight chassis can be assembled even in a factory having no large-scale welding machine available.

According to a preferred embodiment of the present invention, in the above-structured backlight chassis for a liquid crystal display panel, it is preferable that each of the chassis plates have a beam-shaped portion in a border portion with an adjoining chassis plate, and that beam-shaped portions of adjoining chassis plates be superposed one on top of the other, and a trough-shaped member, which is another component, be superposed on edges of the plurality of chassis plates perpendicular or substantially perpendicular to the beam-shaped portions to connect adjoining chassis plates to each other.

With this structure, the beam-shaped portions and the trough-shaped member function as enhancing metal fittings to increase the rigidity of the backlight chassis, and this helps reduce oil canning.

According to a preferred embodiment of the present invention, in the above-structured backlight chassis for a liquid crystal display panel, it is preferable that adjoining chassis plates be connected to each other with a screw that is screwed into a superposition portion of the beam-shaped portions, and a screw that is screwed into a superposition portion of the trough-shaped member and the edges of the chassis plates.

With this structure, large-area backlight chassis can be assembled even in a factory having no large-scale welding machine available.

According to a preferred embodiment of the present invention, in the above-structured backlight chassis for a liquid crystal display panel, it is preferable that division of the whole chassis be performed along a division line that is parallel or substantially parallel to a short side of the whole chassis.

With this structure, it is possible to obtain a chassis plate that is shaped and sized so as to be handy.

According to a preferred embodiment of the present invention, in the above-structured backlight chassis for a liquid crystal display panel, it is preferable that a left-end chassis plate and a right-end chassis plate be partitioned by the division line, and that the left-end chassis plate and the right-end chassis plate be point-symmetrical with each other.

With this structure, the left-end and right-end chassis plates can be produced as identical members, and this helps reduce production cost.

According to a preferred embodiment of the present invention, it is possible to provide a backlight chassis for a liquid crystal display panel that is made of a metal sheet and that suffers only minor oil canning despite having a large area, and in which abnormal noise and brightness non-uniformity is prevented from occurring.

Other features, elements, steps, characteristics and advantages of the present invention will become more apparent from the following detailed description of preferred embodiments of the present invention with reference to the attached drawings

DETAILED DESCRIPTION OF THE PREFERRED EMBODIMENTS

Figure 1:
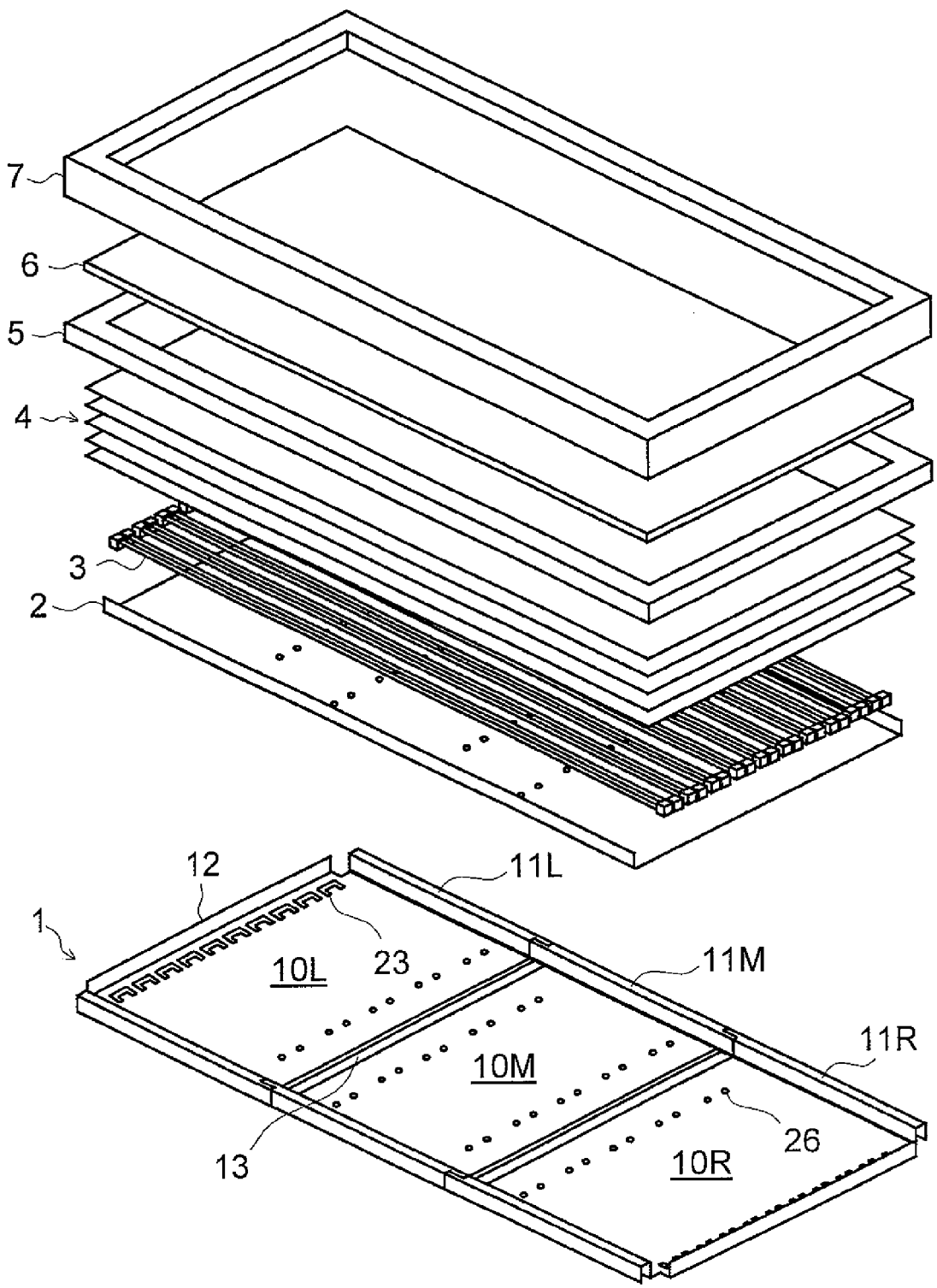
FIG. 1 is an exploded perspective view of a liquid crystal display device according to a first preferred embodiment of the present invention.

A description will be given below of a first preferred embodiment of the present invention with reference to FIGS. 1 to 10. In the exploded perspective view of FIG. 1, components of a liquid crystal display device are illustrated under an assumption that the liquid crystal display is to be assembled such that its display surface faces upward. Located at the lowermost position is a backlight chassis on which the present preferred embodiment of the present invention is focused, and the structure of the backlight chassis will be described later in detail. On the backlight chassis, a reflection sheet 2 is laid, and over the reflection sheet 2, a plurality of light source lamps 3 are arranged. A straight cold-cathode tube is typically used as the light source for a backlight, but a lamp of different type, such as a hot-cathode tube or a xenon lamp, can be used.

An optical-sheet assembly 4, which includes a diffusion plate, a lens sheet, a deflection/reflection sheet, and a diffusion sheet, is placed over the lamps 3. The optical-sheet assembly 4 is used to adjust properties of light emitted from the light source lamps 3.

The optical-sheet assembly 4 is fitted to a backlight chassis 1 with a picture-frame shaped frame 5. A liquid crystal display panel 6 is placed on the frame 5. Placed at the uppermost stage is a picture-frame shaped bezel 7. The bezel 7 fixes the liquid crystal display panel 6 to the backlight chassis 1, and also refines the overall appearance of the liquid crystal display device.

Next, the structure of the backlight chassis 1 will be described. The backlight chassis 1 is preferably rectangular or substantially rectangular in plan view, and has a shape of a tray having rising peripheral edges. The backlight chassis 1 is formed preferably by combining a plurality of chassis plates each formed of a metal sheet (in this preferred embodiment, a steel sheet) cut and stamped into a predetermined shape. Each of the chassis plates is one of sections into which a whole chassis is divided. In this preferred embodiment, the backlight chassis 1 is preferably partitioned into three chassis plates by two division lines that are parallel or substantially parallel to the short side of the rectangular or substantially rectangular plan shape of the backlight chassis 1. The three chassis plates preferably include a left-end chassis plate 10L, a right-end chassis plate 10R, and a middle chassis plate 10M located between the left-end and right-end chassis plates 10L and 10R.

The left-end and right-end chassis plates 10L and 10R are stamped as components having the same shape by using a same die, and then, with the orientation of one of them reversed, they are arranged to be point-symmetrical with each other. Clip fitting portions are arranged on the left-end and right-end chassis plates 10L and 10R to hold middle portions of the light source lamps 3, and the clip fitting portions are arranged out of the point symmetry between the left-end and right-end chassis plates 10L and 10R. This will be described later in detail.

The left-end and right-end chassis plates 10L and 10R naturally have a same area, and the middle chassis plate 10M also has substantially the same area as the left-end and right-end chassis plates 10L and 10R. In other words, the left-end, right-end, and middle chassis plates 10L, 10R, and 10M are obtained by dividing the backlight chassis 1 into three substantially equal portions.

Trough-shaped portions are formed in the left-end, right-end, and middle chassis plates 10L, 10R, and 10M at portions thereof that form longer sides of a whole chassis. Specifically, in the left-end chassis plate 10L, trough-shaped portions 11L are formed at top and bottom edges thereof in FIG. 2. Likewise, trough-shaped portions 11R are formed at top and bottom edges of the right-end chassis plate 10R in FIG. 2, and trough-shaped portion 11M are formed at top and bottom edges of the middle chassis plate 10M in FIG. 2. The trough-shaped portions 11L, 11R, and 11M preferably have a same sectional shape, that is, a U-shape that is open downward, for example. The trough-shaped portions 11L, 11R, and 11M are connected together such that adjoining trough-shaped portions are connected to each other at border portions between the left-end and middle chassis plates 10L and 10M and between the middle and right-end chassis plates 10M and 10R. Thus, contiguous trough shapes are formed.

Beam-shaped portions extending in the short-side direction of the whole chassis are formed in each of the left-end chassis plate 10L, the right-end chassis plate 10R, and the middle chassis plate 10M. The "beam-shaped portion" is a ridge-shaped or furrow-shaped structure that rises up from a flat surface portion of a chassis plate and increases the material mechanical modulus of section. The beam-shaped portions of the left-end and right-end chassis plates 10L and 10R are preferably formed in a different way from the beam-shaped portion of the middle chassis plate 10M. What is common to the chassis plates is that each of the chassis plates 10L, 10R, and 10M has a beam-shaped portion at least at a border portion with an adjoining chassis plate.

In each of the left-end and right-end chassis plates 10L and 10R, a rising portion 12 is provided at an edge thereof located farther from a center of the backlight chassis 1. The rising portion 12 is one of beam-shaped portions provided in plurality in each of the left-end chassis plate 10L and the right-end chassis plate 10R. The rising portions 12, together with the trough-shaped portions 11L, 11R, and 11M, give the backlight chassis 1 a tray configuration.

Figure 6:
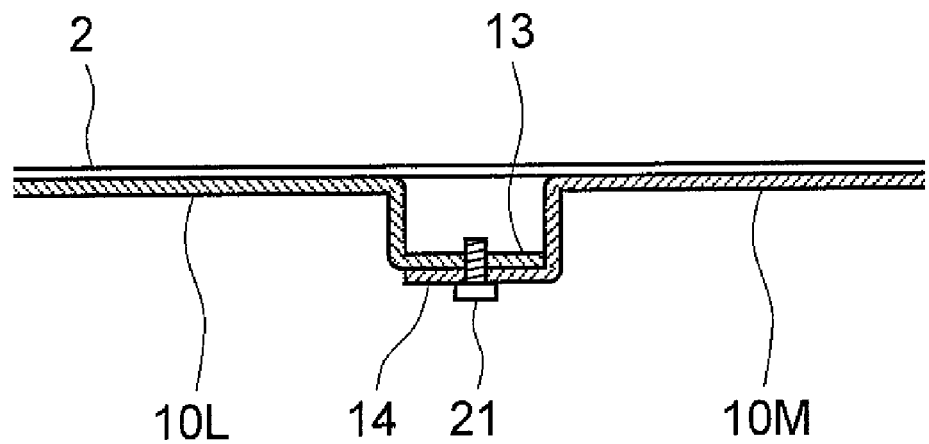
FIG. 6 is an enlarged partial sectional view of a backlight chassis.

Edges of the left-end chassis plate 10L and the right-end chassis plate 10R that are located closer to the center of the backlight chassis 1 are border portions with the middle chassis plate 10M flanked by them. At these portions, both of the left-end chassis plate 10L and the right-end chassis plate 10R have a superposition portion 13 to be superposed on the middle chassis plate 10M. As shown in FIG. 6, the superposition portions 13 are each L-shaped in section, and this L-shaped section makes the superposition portions 13 function as beam-shaped portions of the left-end chassis plate 10L and the right-end chassis plate 10R. Incidentally, the superposition portion 13 of the left-end chassis plate 10L and that of the right-end chassis plate 10R face opposite directions (see FIG. 9).

As for the middle chassis plate 10M, its left edge is a border portion with the left-end chassis plate 10L and its right edge is a border portion with the right-end chassis plate 10R. At these border portions, superposition portions 14 are formed. The superposition portions 14 are also L-shaped in section. The superposition portions 14 at the right and left edges of the middle chassis plate 10M are oriented in opposite directions, but, in section, a lateral stroke of letter L of the superposition portions 14 is laid under a lateral stroke of letter L of the superposition portions 13. The L-shaped sectional shape causes the superposition portions 14 to function as beam-shaped portions of the middle chassis plate 10M.

In this way, the trough-shaped portions and the beam-shaped portions are arranged along the four sides of each of the left-end chassis plate 10L, the right-end chassis plate 10R, and the middle chassis plate 10M. This increases the rigidity of the backlight chassis 1 both in the long-side and short-side directions, and thus reduces oil canning occurring in center portions of the chassis plates (indicated with C in FIG. 2).

Superposition portions are also formed in border portions between the trough-shaped portions 11L and 11M and between the trough-shaped portions 11R and 11M. A description will be given of the structure of these superposition portions, taking the superposition portion between the trough-shaped portions 11L and 11M as an example.

Figure 3:
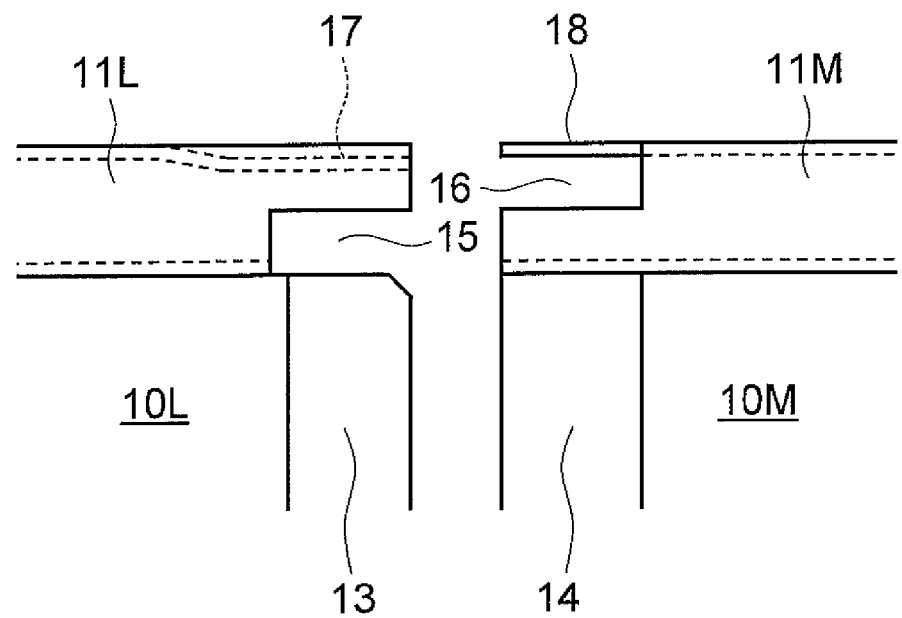
FIG. 3 is an enlarged partial plan view of a backlight chassis in a disassembled state.
Figure 4:
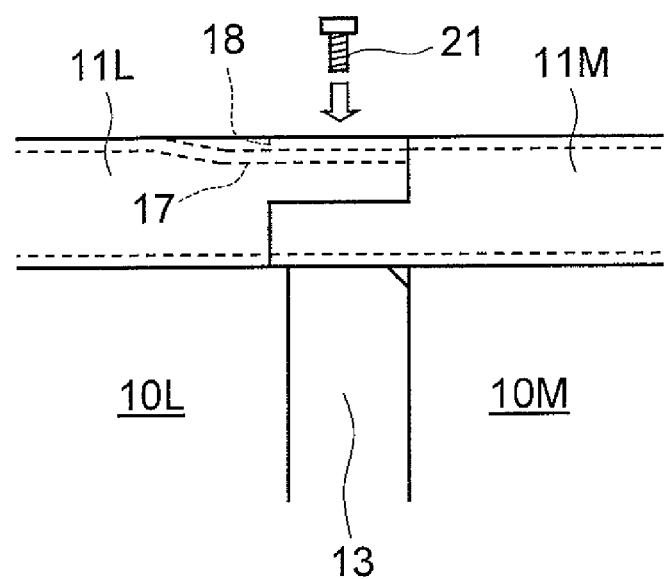
FIG. 4 is an enlarged partial plan view of a backlight chassis in an assembled state.
Figure 5:
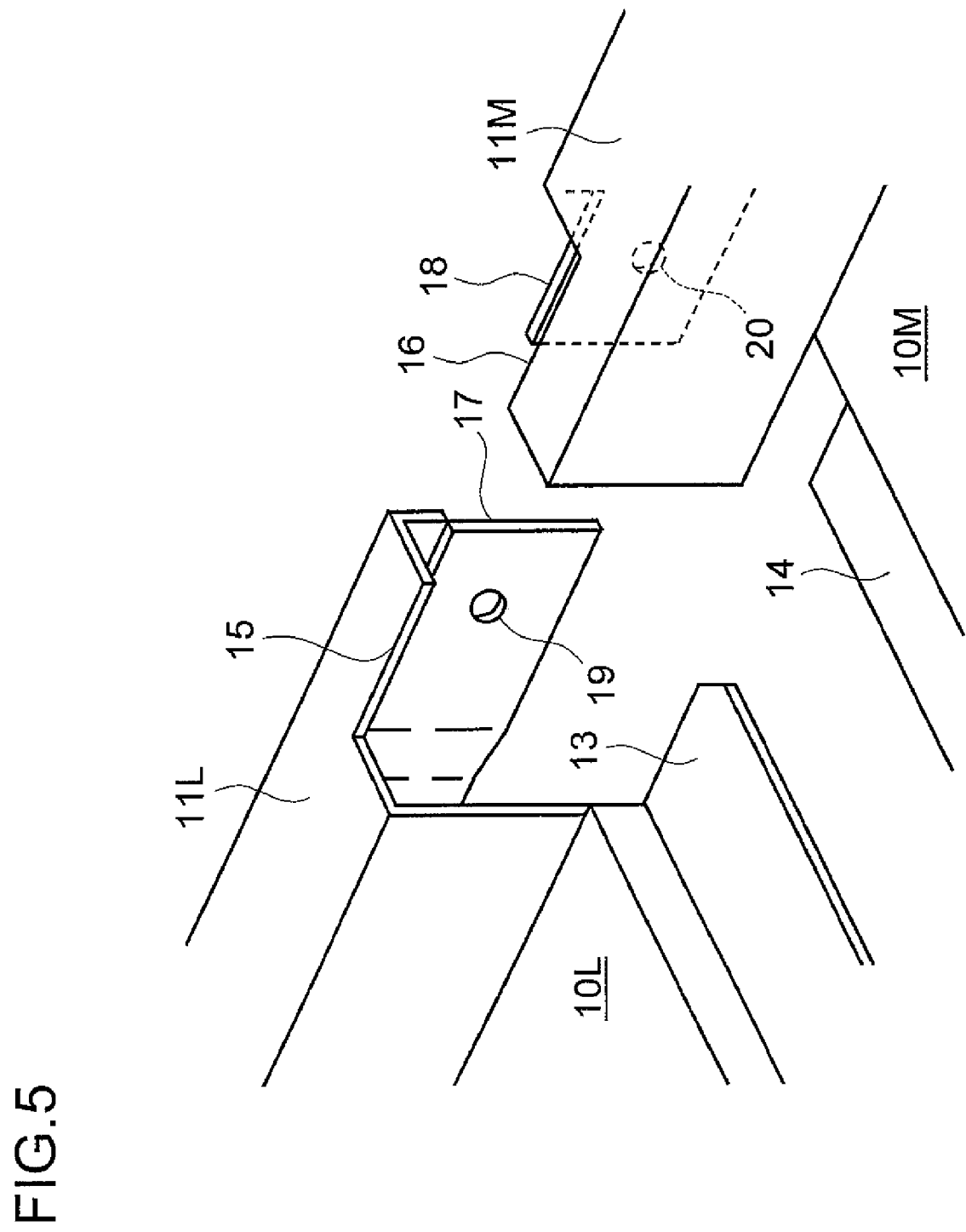
FIG. 5 is an enlarged partial perspective view corresponding to FIG. 3.

As shown in FIGS. 3 to 5, a cutout portion 15 is formed in the trough-shaped portion 11L on a side facing the center of the left-end chassis plate 10L. A cutout portion 16 is formed in the trough-shaped portion 11M on a side facing outside of the middle chassis plate 10M. Remaining portions of the trough-shaped portions 11L and 11M fit into the cutout portions 16 and 15, respectively, such that the trough-shaped portions 11L and 11M interlace with each other.

A connection piece 17 is provided in a vertical wall of the trough-shaped portion 11L facing outside of the left-end chassis plate 10L. The connection piece 17 is depressed toward an inside of the trough-shaped portion 11L by a distance equivalent to the thickness of the metal sheet of which the trough-shaped portion 11L is made. In the trough-shaped portion 11M, at a position corresponding to the position of the connection piece 17, a connection piece 18 is formed. The connection piece 18 is not depressed toward inside the trough-shaped portion 11M. When the trough-shaped portions 11L and 11M are brought close to each other, the cutout portions 15 and 16 engage with each other, and at the same time, the connection piece 18 is superposed on the connection piece 17 from outside, and thus the state shown in FIG. 4 is achieved. Pilot holes 19 and 20 (see FIG. 5) formed in the connection pieces 17 and 18 for screws are aligned with each other. Into the pilot holes 19 and 20 aligned with each other, a screw 21 (see FIG. 4), which is a self-tapping screw, is screwed to penetrate therethrough, and thereby the trough-portions 11L and 11M are connected to each other. To be precise, it is in the pilot hole 19 that screw grooves are formed by tapping, and the pilot hole 20 has an inner diameter large enough to allow easy passage of the screw 21 therethrough.

The superposition portion between the trough-shaped portions 11R and 11M is structured and fixed in the same manner as described above, except that the structure is laterally opposite to the above-described structure.

When the trough-shaped portions 11R and 11M are superposed and the trough-shaped portions 11R and 11M are superposed, the superposition portions 13 and 14 are also superposed. In the same manner as in the trough-shaped portions, the superposition portions 13 and 14, after being superposed one on top of the other, are also connected to each other with a screw 21 penetrating therethrough.

When the left-end and middle chassis plates 10L and 10M are connected to each other and the right-end and middle chassis plates 10R and 10M are connected to each other as described above, the trough-shaped portions 11L, 11R, and 11M are connected to form a line of trough-shaped portion whereby the rigidity of the backlight chassis 1 in the long-side direction is increased to reduce oil canning. In addition, since the left-end, right-end, and middle chassis plates 10L, 10R, and 10M are provided with beam-shaped portions extending in the short-side direction of the backlight chassis 1, the rigidity of the backlight chassis 1 in the short-side direction is increased to reduce oil canning.

Figure 7:
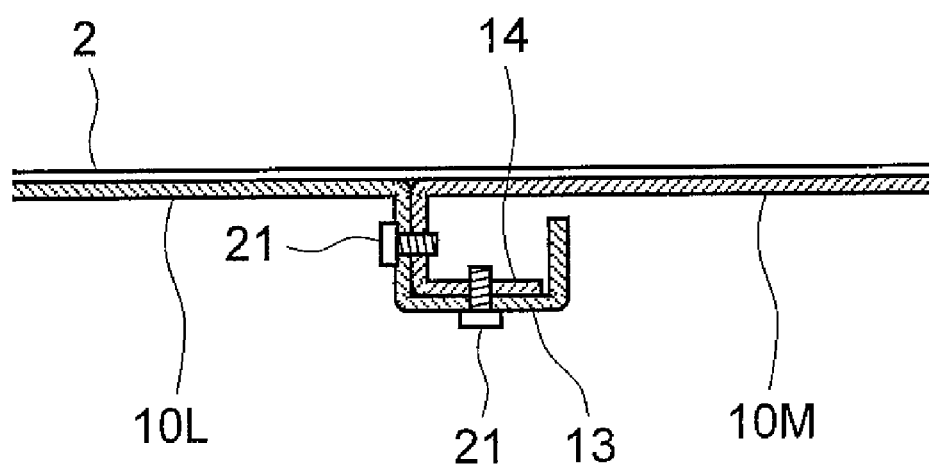
FIG. 7 is an enlarged partial sectional view showing a modified example of the portion shown in FIG. 6.

A modified example of the structure of the superposition portion is shown in FIG. 7. Here, the superposition portion 13 preferably has a form of U-shaped groove in section, while the superposition portion 14 is C-shaped in section, for example. These sectional shapes cause the superposition portions 13 and 14 to function as beam-shaped portions of the left-end, right-end, and middle chassis plates 10L, 10R, and 10M. The superposition portions 13 and 14 can be firmly connected to each other by setting the superposition portion 14 in the superposition portion 13 and fastening them together with screws 21 penetrating through them in two directions of vertical and horizontal directions.

In both examples shown in FIGS. 6 and 7, the superposition portions 13 and 14 together define a groove-shaped space, and since the screws 21 are screwed into them toward the groove-shaped space, it is possible to avoid tip-ends of the screws 21 interfering with some member and to avoid some member being caught on the tip-ends of the screws 21.

According to the example shown in FIG. 6, the groove formed with superposition portions 13 and 14 is significantly wide, but, being completely covered with the reflection sheet 2, it does not have any negative effect on the optical properties of the backlight chassis 1.

The superposition portions 13 and 14 may have various shapes other than those shown in FIGS. 6 and 7. Likewise, the superposition portions in the trough-shaped portions may have various shapes in addition to the shapes shown in FIGS. 3 to 5.

In the left-end and right-end chassis plates 10L and 10R is formed a fitting portion 23 for a socket 22 (see FIGS. 8 and 9) that holds an end of the light source lamp 3. The fitting portion 23 is a through hole of a predetermined shape into which two sockets 22 are fitted. The fitting portion 23 is formed in plurality such that a plurality of fitting portions 22 are aligned in the short-side direction along an edge of each of the left-end and right-end chassis plates 10L and 10R that is farther from the center of the backlight chassis 1. Incidentally, the sockets 22 are electrically connected to an unillustrated control substrate in a control box 24 (see FIG. 9) provided on a bottom surface of the backlight chassis 1.

The light source lamp 3 is of a long length, and makes noise when vibration is transferred thereto. To avoid this, the middle portion of the light source lamp 3 is fixed to the backlight chassis 1 with a clip 25.

Figure 10:
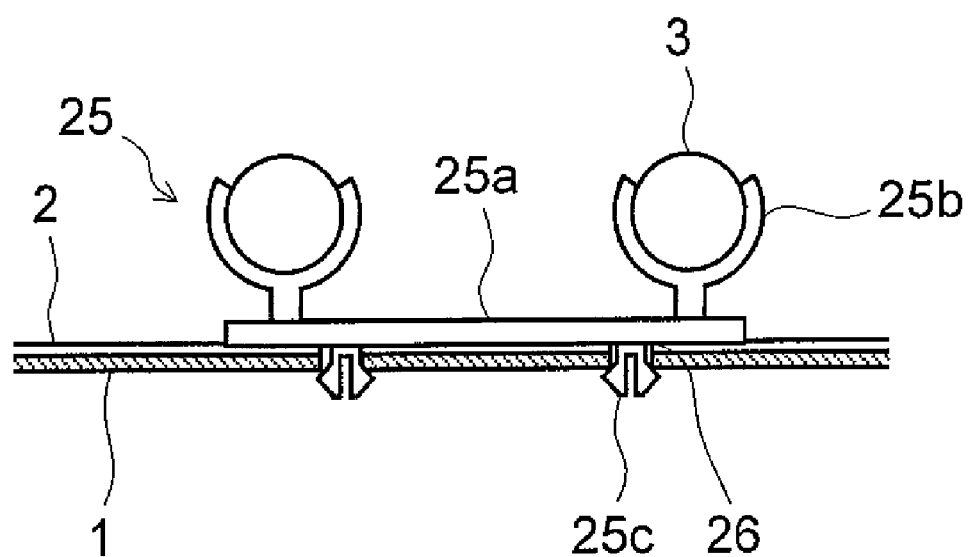
FIG. 10 is an enlarged front view of a clip holding a middle portion of a light source lamp.

The structure of the clip 25 is shown in FIG. 10. The clip 25 is structured such that a lamp holder 25b having a C-shape that is open upward is provided on a top surface of a flat base 25a that is rectangular or substantially rectangular in plan view. The lamp holder 25b holds the light source lamp 3 with its elasticity, and a total of two lamp holders 25b are provided one at each end in a longitudinal direction of the base 25a. On a bottom surface of the base 25a, two snap pins 25c each having a bulging head portion and a slot groove are formed at an interval in the longitudinal direction of the base 25a. The clip 25 preferably is integrally formed of an elastic synthetic resin.

A fitting portion 26 for the clip 25 is provided on the backlight chassis 1 and the reflection sheet 2 that is adhered to a top surface of the backlight chassis 1. The fitting potion 26 includes two through holes through each of which a snap pin 25c passed. When the snap pin 25c is pressed against the fitting portion 26 from above, the bulging head portion of the snap pin 25c shrinks to pass through the hole. Coming out of the bottom surface of the backlight chassis 1, the head portion of the snap pin 25c springs back to its original bulging state, and thus the clip 25 is brought into a fitted state.

The light source lamp 3 is held at two positions in the middle portion thereof using two clips 25. One clip 25 holds two light source lamps 3, and thus two fitting portions 26 are provided at an interval in the length direction of the light source lamp 3 for every two light source lamps 3.

By holding the light source lamps 3 at middle portions thereof with the clips 25, the light source lamps 3 can be prevented from being vibrated to make noise. The clips 25 are fitted on the left-end chassis plate 10L, the right-end chassis plate 10R, or the middle chassis plate 10M. The left-end, right-end, and middle chassis plates 10L, 10R, and 10M all suffer only a small degree of oil canning, and thus, even when an impact is applied to the backlight chassis 1, no source lamp 3 comes off the clips 25.

The clips 25 are preferably formed of a synthetic resin that is poor in thermal conductivity, yet they conduct to the backlight chassis 1 a certain ratio of heat generated by the light source lamps 3. By being thus deprived of heat, the light source lamps 3 deteriorate in brightness around the clips 25. If the clips 25 are arranged in a line in the short-side direction of the backlight chassis 1, a zone having markedly low brightness appears. To prevent this from happening, the clips 25 are dispersedly arranged. A specific method of such an arrangement will be described with reference to FIGS. 2 and 8.

Figure 2:
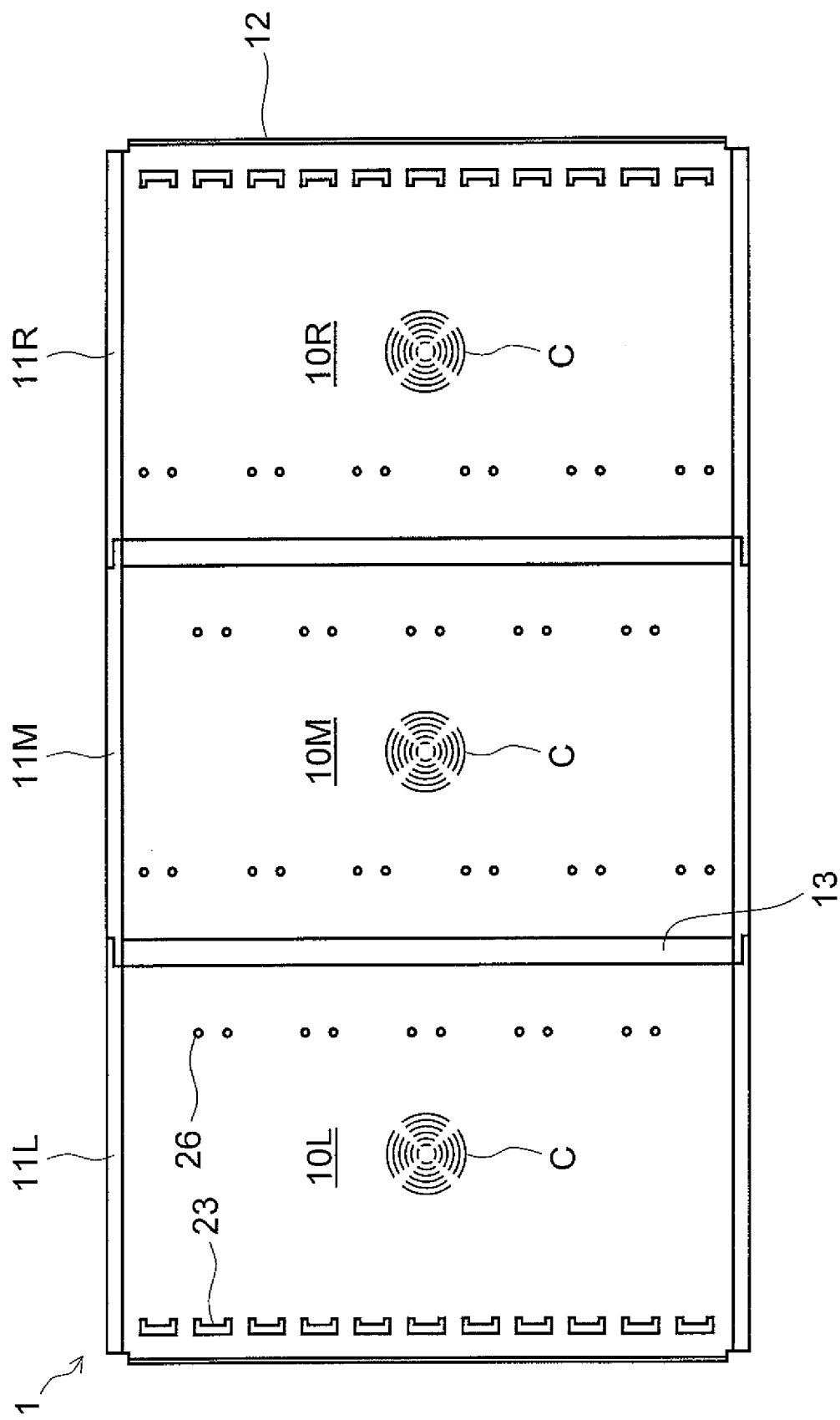
FIG. 2 is a plan view of a backlight chassis.
Figure 8:
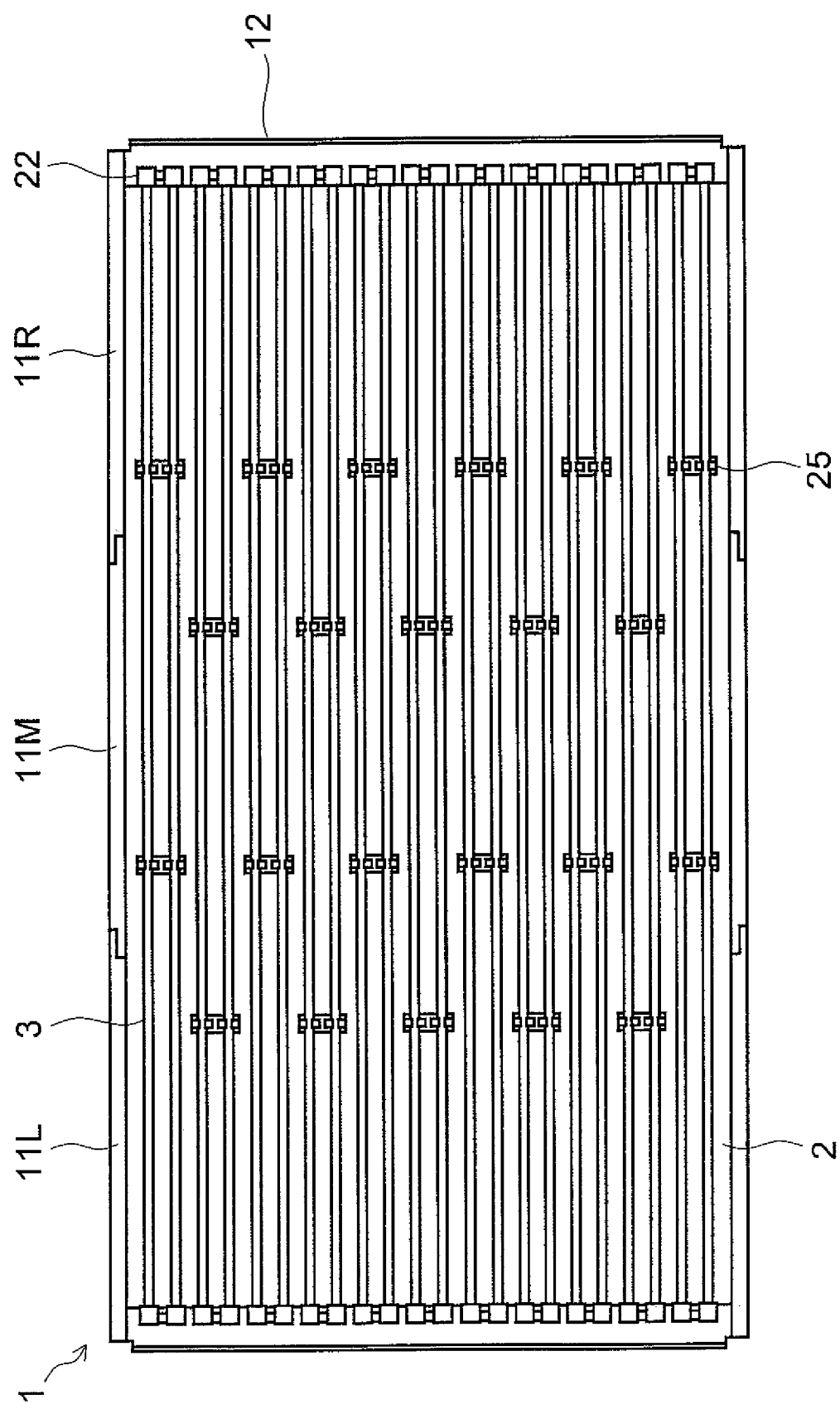
FIG. 8 is a plan view of a backlight chassis to which a light source lamp is attached.
Figure 9:
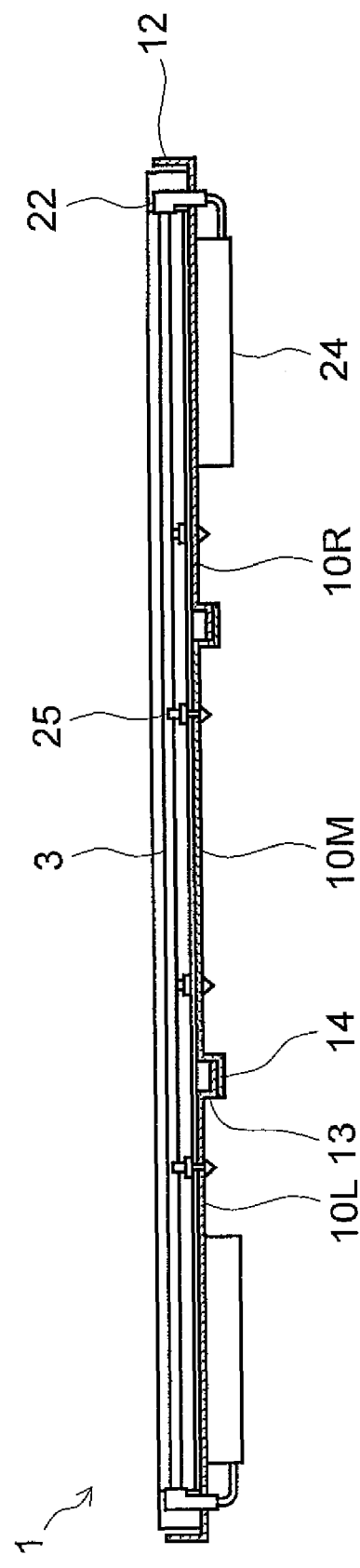
FIG. 9 is a sectional view of the backlight chassis shown in FIG. 8.

In FIGS. 2 and 8, the fitting portions 26 for the top two light source lamps 3 in the figures are set to be positioned as follows. That is, one is positioned close to the left edge of the middle chassis plate 10M, and the other is positioned close to the left edge of the right-end chassis plate 10R. The fitting portions 26 for the next two light source lamps 3 located right under the top two light source lamps 3 are positioned as follows. That is, one is positioned close to the right edge of the middle chassis plate 10M, and the other is positioned close to the right edge of the left-end chassis plate 10L. These arrangements are alternately repeated from top to bottom in FIGS. 2 and 8. As a result, positions of the fitting portions 26 are staggered, and low-brightness regions are so dispersed that they are not obtrusive in viewing.

To hold the set number of light source lamps 3, the fitting portions 26 are preferably formed at five locations, for example, in the left-end chassis plate 10L, and at six locations, for example, in the right-end chassis plate 10R. This breaks the point-symmetry between the left-end and right-end chassis plates 10L and 10R, but they can easily be made point-symmetry with each other by adjusting the number of light source lamps 3 such that a same number of fitting portions 26 are formed in the left-end and right-end chassis plates 10L and 10R.

In this preferred embodiment, a clip 25 holds two light source lamps 3, but the number of light source lamps 3 that a clip 25 holds is not limited to two. A clip 25 may hold three or more light source lamps 3, or may hold only one light source lamp 3. The number of positions in the middle portion of each light source lamp 3 at which it is held is preferably two in this preferred embodiment, but this is not meant to be a limitation, and the number may be set according to the length of the light source lamps 3.

The clip 25 may be fitted by a method other than using the snap pin 25c as in this preferred embodiment. For example, a structure is possible in which the clip 25 is adhered to the reflection sheet 2 with a double-stick tape.

In this preferred embodiment, the backlight chassis 1 is preferably divided into three chassis plates, but this is merely an example and is not meant to be a limitation. The number of chassis plates into which the backlight chassis 1 is divided may be determined according to the size of the backlight chassis 1. Division into two chassis plates may be enough with a compact backlight chassis 1. In addition, the direction of the division-line is not limited to the short-side direction of the backlight chassis 1. The backlight chassis 1 may be divided along the long-side direction or may be diagonally divided.

Figure 11:
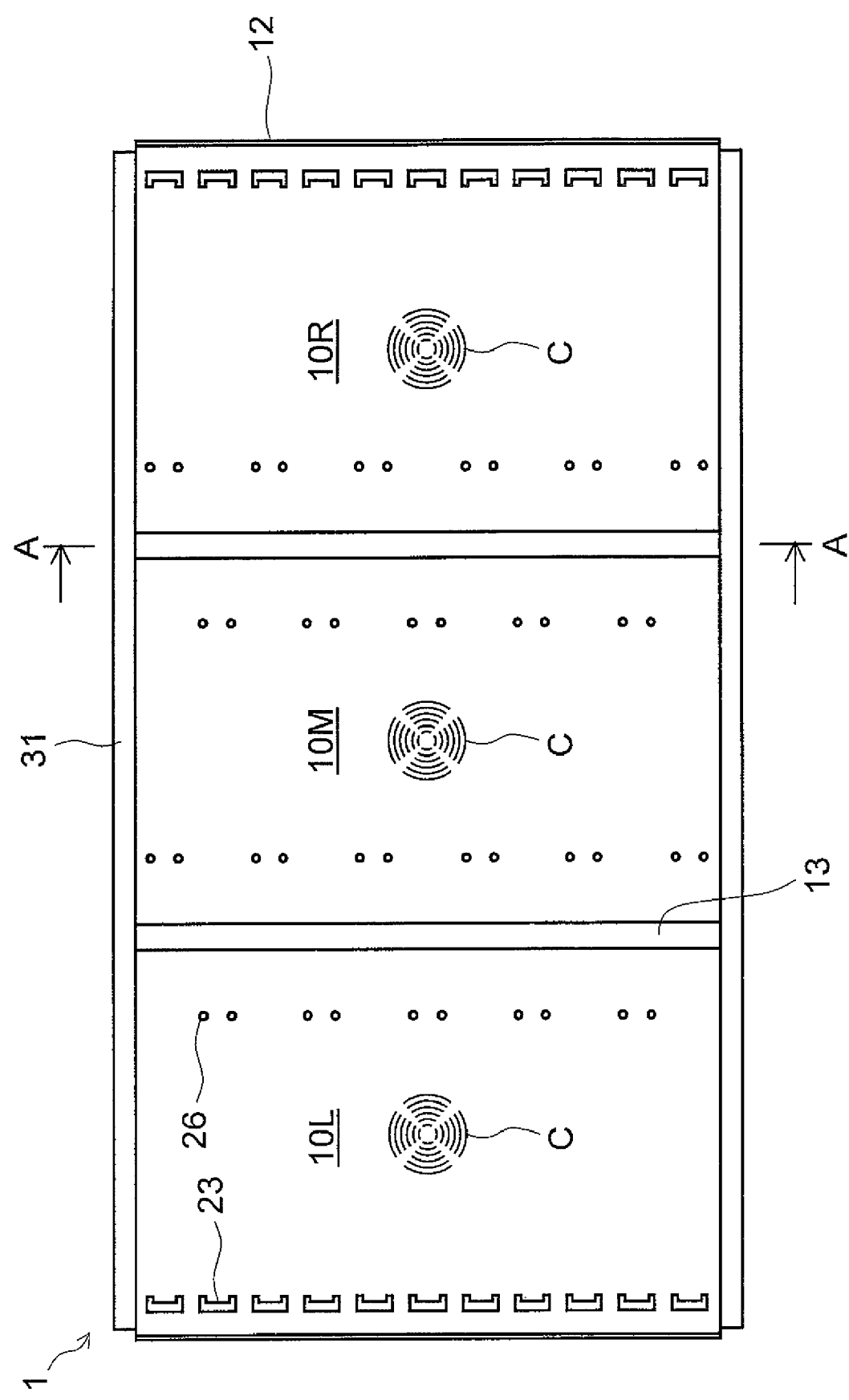
FIG. 11 is a plan view of a backlight chassis of a second preferred embodiment.
Figure 12:
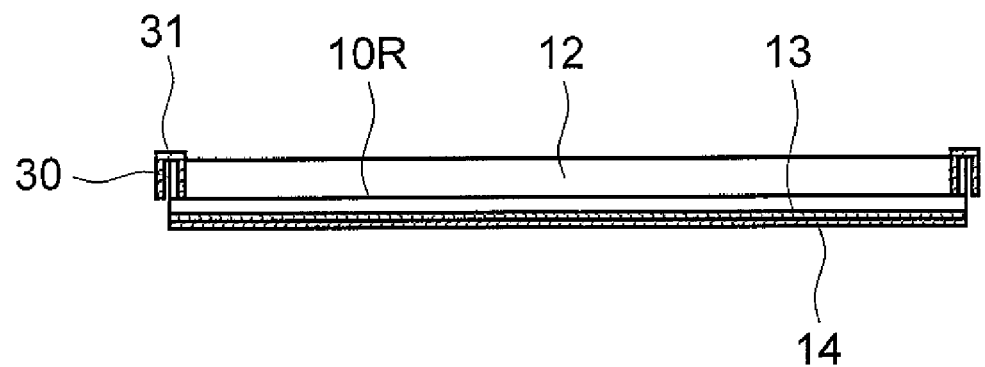
FIG. 12 is a sectional view taken along line A-A Line of FIG. 11.
Figure 13:
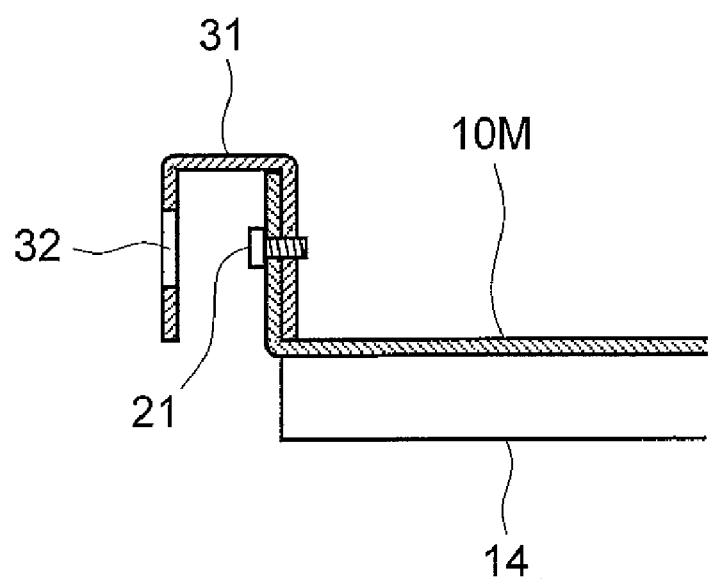
FIG. 13 is an enlarged partial sectional view of the backlight chassis according to the second preferred embodiment of the present invention.

Next, a second preferred embodiment of the present invention will be described with reference to FIGS. 11 to 13. FIG. 11 is a plan view of a backlight chassis, FIG. 12 is a sectional view taken along line A-A in FIG. 11, and FIG. 13 is an enlarged partial sectional view of the backlight chassis.

One of the unique features of the second preferred embodiment is that the trough-shaped portions 11L, 11R, and 11M in the first preferred embodiment are replaced by trough-shaped members 31. The trough-shaped members 31 have substantially the same sectional shape as the trough-shaped portions 11L, 11R, and 11M, and have the same length as the trough-shaped portions 11L, 11R, and 11M connected together.

In each of the left-end chassis plate 10L, the right-end chassis plate 10R, and the middle chassis plate 10M, on an edge thereof perpendicular or substantially perpendicular to the superposition portions 13 and 14, which are beam-shaped portions, a rising portion 30 that is similar to the rising portions 12 is formed. The trough-shaped member 31 is so arranged as to cover the rising portion 30, and to one side wall of the trough-shaped member 31 are connected rising portions 30 of the left-end, right-end, and middle chassis plates 10L, 10R, and 10M. As in the case of connecting the superposition portions 13 and 14 together, screws 21 are preferably used to achieve these connections.

In this preferred embodiment, an inner surface of one side wall of the trough-shaped member 31, that is, a side surface of the trough-shaped member 31 facing a center of the trough-shaped member 31 is superposed on inner side surfaces of the rising portions 30, that is, side surfaces of the rising portions 30 that face the center of the backlight chassis 1. The screws 21 are screwed into the rising portions 30 and then into the trough-shaped member 31 to connect them together. In the rising portions 30, pilot holes are formed to allow easy passage of the screws 21 therethrough, and in the trough-shaped member 31, pilot holes are formed in which screw grooves are to be formed by tapping.

In the other side wall of the trough-shaped member 31, through holes 32 are formed at positions corresponding to the screws 21 for allowing a driver bit of an unillustrated driver to pass therethrough. Instead of the through holes, a cut may be formed at an edge of the other side wall of the trough-shaped member 31 for allowing a driver bit to pass therethrough.

It should be understood that the preferred embodiments specifically described above are not meant to limit the present invention, and that many variations and modifications can be made within the spirit of the present invention.

The present invention is widely applicable to a backlight chassis for a large-size liquid crystal display panel.

While preferred embodiments of the present invention have been described above, it is to be understood that variations and modifications will be apparent to those skilled in the art without departing the scope and spirit of the present invention. The scope of the present invention, therefore, is to be determined solely by the following claims

The invention claimed is:

1. A backlight chassis for a liquid crystal display panel, comprising:
   a plurality of chassis plates each defined by a metal sheet that has been cut and stamped into a predetermined shape; wherein
   each of the plurality of chassis plates corresponds to one of a plurality of sections into which a whole chassis is divided;
   adjoining ones of the plurality of chassis plates are connected to each other to define the whole chassis;
   a trough-shaped portion is provided in each of the plurality of chassis plates at a portion thereof which defines a longer side of the whole chassis;
   a superposition portion is defined at a border portion between adjoining trough-shaped portions of the plurality of chassis plates;
   at the superposition portion, a cutout portion is defined in a first one of the trough-shaped portions on a side thereof facing a center of a respective one of the plurality of chassis plates to which the first one of the trough-shaped portions belongs, and a cutout portion is defined in a second one of the trough-shaped portions on a side thereof that faces an outside of the respective one of the plurality of chassis plates to which the second one of the trough shaped portions belongs; and
   the trough-shaped portions at the superposition portion interlace with each other such that a remaining portion of the second one of the trough-shaped portion fits into the cutout portion of the first one of the trough-shaped portions.

2. The backlight chassis for a liquid crystal display panel according to claim 1, wherein the adjoining ones of the plurality of chassis plates are connected to each other with a screw that is screwed into the superposition portion.

3. The backlight chassis for a liquid crystal display panel according to claim 1,
   wherein the whole chassis is divided along a division line that is parallel or substantially parallel to a short side of the whole chassis.

4. The backlight chassis for a liquid crystal display panel according to claim 3, wherein a left-end chassis plate of the plurality of chassis plates and a right-end chassis plate of the plurality of chassis plates are partitioned by the division line, and the left-end chassis plate and the right-end chassis plate are point-symmetrical with each other.

* * * * *